United States Patent
Augier

(10) Patent No.: US 8,641,906 B2
(45) Date of Patent: Feb. 4, 2014

(54) METHOD AND SYSTEM FOR DISTRIBUTING AND COLLECTING FLUIDS IN A MULTI-STAGE COLUMN

(75) Inventor: Frederic Augier, Saint Symphorien D Ozon (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 369 days.

(21) Appl. No.: 12/989,125

(22) PCT Filed: Mar. 24, 2009

(86) PCT No.: PCT/FR2009/000320
§ 371 (c)(1),
(2), (4) Date: Dec. 6, 2010

(87) PCT Pub. No.: WO2009/133254
PCT Pub. Date: Nov. 5, 2009

(65) Prior Publication Data
US 2011/0108145 A1  May 12, 2011

(30) Foreign Application Priority Data
Apr. 25, 2008 (FR) .................................. 08 02351

(51) Int. Cl.
*B01D 15/14* (2006.01)
(52) U.S. Cl.
USPC ........... 210/690; 210/264; 210/269; 210/283; 210/284; 210/289; 210/672; 585/822; 585/828; 585/829

(58) Field of Classification Search
USPC ......... 210/201, 209, 264, 269, 283, 284, 289, 210/672, 690; 585/822, 828, 829
See application file for complete search history.

(56) References Cited

U.S. PATENT DOCUMENTS

| 684,412 | A | * | 10/1901 | Davidson | ....................... 210/291 |
| 4,378,292 | A | * | 3/1983 | Haase | ............................ 210/266 |
| 6,024,871 | A | | 2/2000 | Harter et al. | |
| 2008/0121586 | A1 | | 5/2008 | Hotier et al. | |

FOREIGN PATENT DOCUMENTS

| EP | 1 913 988 A1 | 4/2008 |
| FR | 2 708 480 A1 | 2/1995 |
| FR | 2 740 052 A1 | 4/1997 |
| WO | WO 03/008064 A1 | 1/2003 |

OTHER PUBLICATIONS

International Search Report of PCT/FR2009/000320 (Sep. 28, 2009).

* cited by examiner

*Primary Examiner* — Matthew O Savage
(74) *Attorney, Agent, or Firm* — Millen, White, Zelano & Branigan, P.C.

(57) ABSTRACT

The invention concerns a device for distributing fluids which are to supply a multi-stage column having a succession of plates, each plate supporting a bed of granular solid (2) and being provided with a network for distributing said fluids constituted by substantially horizontal lines (6) having a plurality of degrees of branching from 1 to rank N, the ensemble of lines from rank P to rank N being adherent to the base plane of the plate under consideration, and the lines of the last degree of branching N communicating with mixing chambers (8) disposed immediately below said base plane.

16 Claims, 5 Drawing Sheets

Figure 1 – PRIOR ART
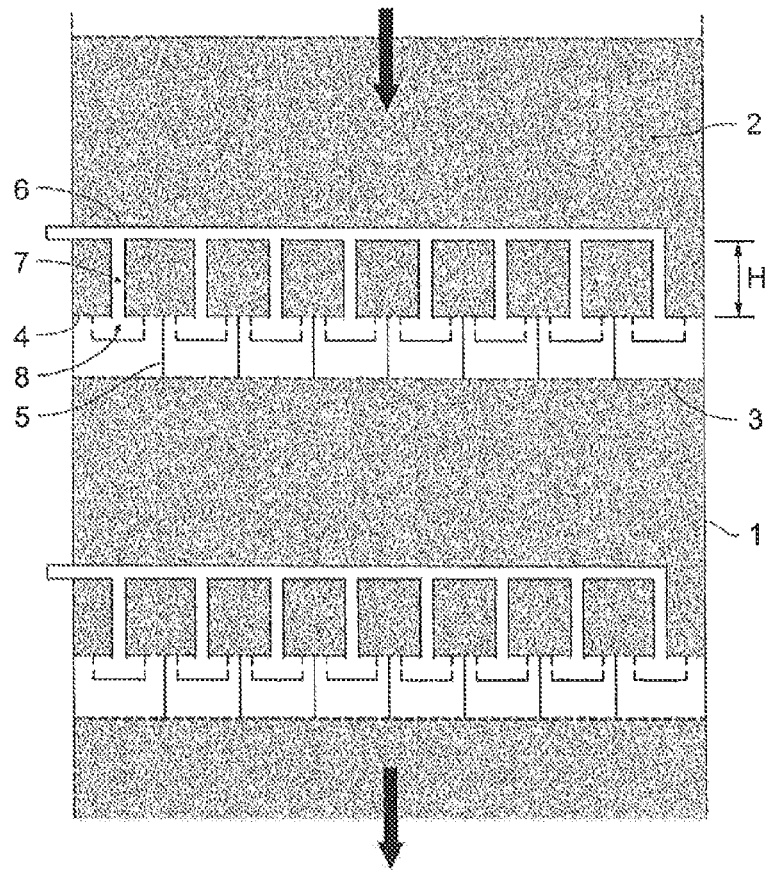
Figure 2 – PRIOR ART
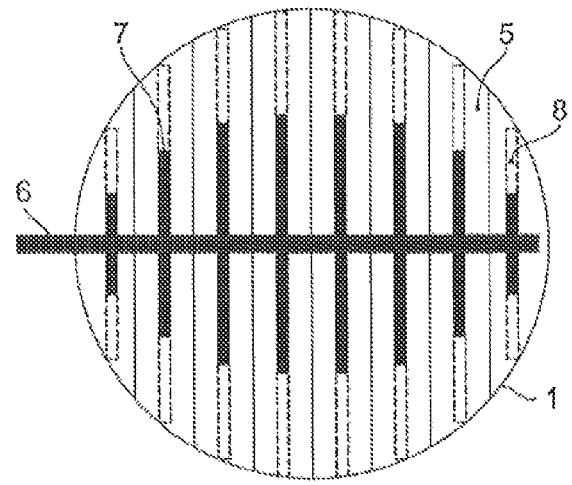

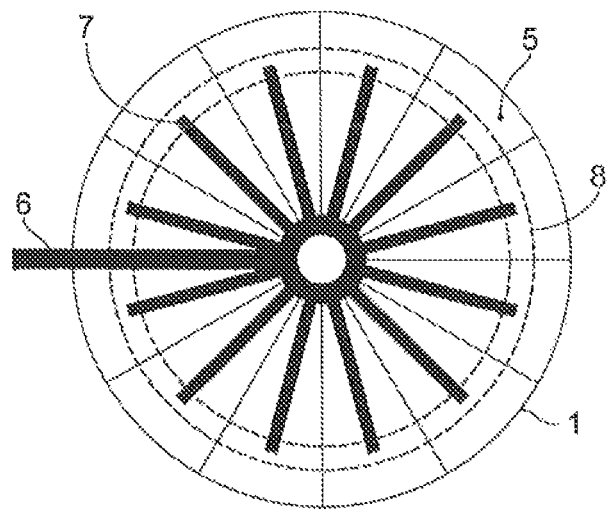
Figure 3 – PRIOR ART
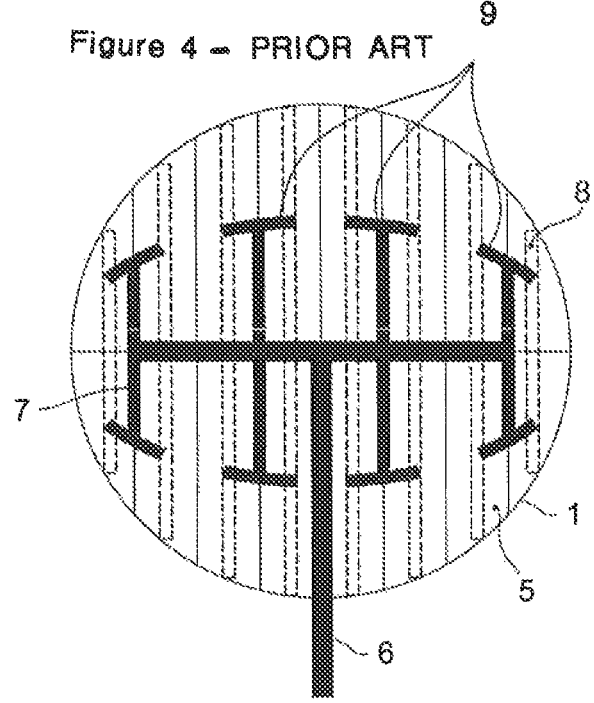
Figure 4 – PRIOR ART

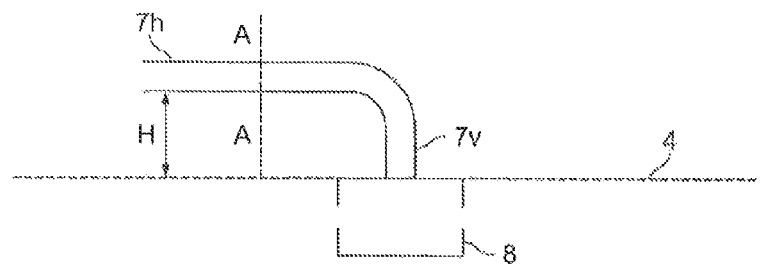
Figure 5a – PRIOR ART
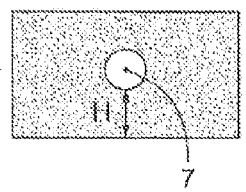
Figure 5b – PRIOR ART
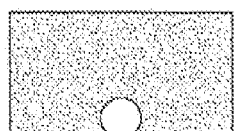
Figure 5c
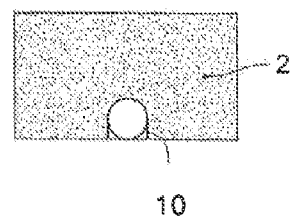
Figure 5d
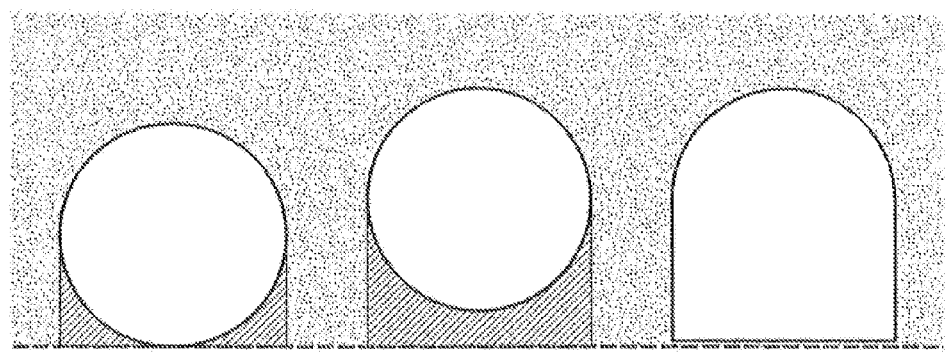
Figure 6a  Figure 6b  Figure 6c

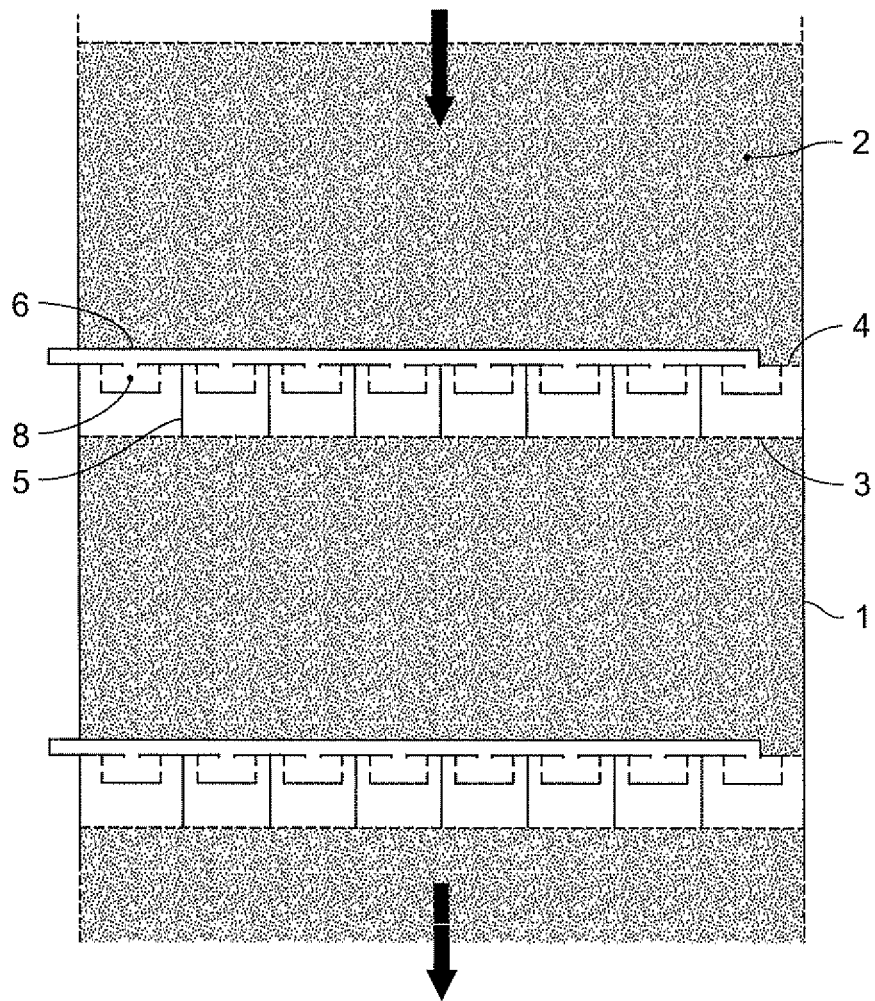

METHOD AND SYSTEM FOR DISTRIBUTING AND COLLECTING FLUIDS IN A MULTI-STAGE COLUMN

FIELD OF THE INVENTION

The invention relates to a novel device for distributing and collecting fluids in a multi-stage column employing a flow of said fluids in a solid particle medium termed a granular medium.

A multi-stage column is a column constituted by a multiplicity of plates disposed along a substantially vertical axis, each plate (termed the support plate) supporting a bed of granular solid and the various successive beds being traversed in series by the fluid or fluids employed in the column. The fluid passing through the successive beds is termed the principal fluid to distinguish it from other fluids which may be added to the principal fluid by way of plates which are generally located between two successive beds and termed distributor plates.

Each bed of granular solid is generally supplied via a distributor plate located upstream of said bed.

The present invention pertains to the distributor plates.

In the remainder of the text, when the abbreviation "plates" is used, this means distributor plates.

A distributor plate typically comprises a network for supplying or collecting fluids, termed a distribution network, and one or more mixing chambers intended to mix the injected or withdrawn fluid via a distribution network with the principal fluid.

The device of the invention is composed of a plurality of distributor plates; its distribution networks are at least partially in contact with the granular medium.

The invention essentially consists of positioning the distribution network of a distributor plate as close as possible to a support plate supporting the granular bed with rank P in the column in order to supply the granular bed with rank P+1. This positioning, as close as possible to the support plate, means that dead volumes located under the lines constituting the distribution network of the distributor plate under consideration are minimized.

The invention also pertains to the possibility of adding, to the distribution network, fillers separating the lines contiguous with the distributor plate of the surrounding granular medium.

The invention means that plug type flow can be approached inside the solid beds of particles, thereby optimizing the performances of the various processes carried out in this type of column, such as simulated moving bed (SMB) type adsorption.

EXAMINATION OF THE PRIOR ART

In multi-stage type reactors or separation columns, the distribution devices used may have a plurality of functions, such as injection or withdrawal of a stream of fluid in the reactor or the column at any level in said column.

In general, this injection or withdrawal function is desirably carried out in a balanced manner between the various regions of the column section.

The column section is generally divided into a certain number of sectors, each sector having to be irrigated in a homogeneous manner with respect to the others.

This necessitates the use of distributors with a particular geometry, which can reach each sector and deliver (or remove) an approximately equal flow over each of the sectors, if these have equal surface areas. If the sectors have different surface areas, the streams which are injected or removed are approximately proportional to the surface area of the associated sectors. When the columns concerned have large dimensions (for example a diameter of 5 to 15 meters), networks using lines which are branched to a greater or lesser extent are often used to guide the fluids from the exterior of the column to various plates of the multi-stage column, then from a given plate to each of the sectors of said plate.

The plates also function to mix the principal flow in the column and the stream or streams injected by the network in order to supply the downstream plates with a fluid having a homogeneous concentration.

Regarding multi-stage column adsorption separation processes of the chromatographic or SMB type, patents WO-2006/027118A1, US-2006/0108274 A1, EP-0 074 815, FR-93109593 provide examples of configurations of distribution networks supplying plates positioned at different heights in the column.

The distribution network may be fairly bulky and routinely, such networks are positioned in the bed of granular solid (catalyst or adsorbent) in order to minimize the total volume of the column.

The alternative consisting of integrating the networks in the distributor plates may also be used, but it often necessitates the use of more voluminous plates, and the total volume of the column is then larger than in the case in which the distribution network is external to the plate and embedded in the granular solid below or above the bed supplied by the network.

The choice of distribution network type, line size and their position must satisfy various criteria:
 supply the distributor plate in a balanced manner over the whole of its section;
 guide the fluids in a synchronous manner in the various zones of the plate, i.e. minimize the distribution of residence times in the network;
 use a network with as small a bulk as possible to maximize the volume of active solid;
 use a network in which the velocities of the fluids are sufficiently low to avoid the risk of vibration which can damage the network and the plate.

In order to satisfy the various criteria, networks which may sometimes be large in size are used, and it has been shown that the position of the networks within the granular medium itself may perturb the flow in the column. This is particularly the case in processes using a granular solid and in which plug flow is desired.

The term "plug" flow means a flow in which the velocities are as homogeneous as possible in direction and magnitude in order to minimize axial dispersion in the equipment under consideration. It is particularly important that this objective be achieved in simulated moving bed (SMB) separation processes using one or more multi-stage columns.

BRIEF DESCRIPTION OF THE FIGURES

FIG. 1, which is in accordance with the prior art, is a diagrammatic view of a portion of a multi-stage column, the flow of fluids being a downflow;

FIG. 2, which is in accordance with the prior art, is a representation of a "rake" type distribution network;

FIG. 3, which is in accordance with the prior art, is a representation of an "octopus" type distribution network;

FIG. 4, in accordance with the invention, is a representation of a distribution network with a succession of multiple subdivisions or branches;

FIG. 5A, which is in accordance with the prior art, corresponds to a detailed view of a distribution network in the bed of granular solid;

FIG. 5B, which is in accordance with the prior art, corresponds to a section along AA in FIG. 5A in the case of a non-zero distance between the network and the lower plate in accordance with the prior art;

FIG. 5C, in accordance with the invention, corresponds to the section AA of FIG. 5A in the case in which the network is adherent to the distributor plate;

FIG. 5D, in accordance with the invention, corresponds to the section AA of FIG. 5A in the case in which the network is adherent to the distributor plate and is also provided with fillers which can eliminate the dead volumes between the lines of the network and said plate;

FIGS. 6A, 6B, 6C, in accordance with the invention, represent various implementations of the invention;

FIG. 7, in accordance with the invention, corresponds to a diagrammatic view of a portion of the multi-stage column using a network in accordance with the invention;

BRIEF DESCRIPTION OF THE INVENTION

Figure 8A:
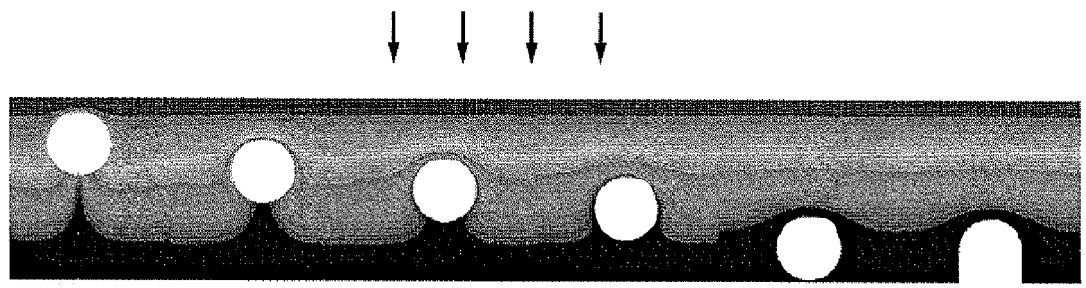
FIG. 8A is a view deriving from a computer simulation of the phenomenon of dead volume which the invention can reduce.

The problem which the present invention seeks to solve is that of improving the flow of fluids within a column comprising a multiplicity of plates each carrying a bed of granular solid, termed a multi-stage column.

The improvement in flow in the present context means that the flow ideally approaches plug flow, i.e. a flow in which the axial dispersion of fluid passing through the various successive beds of the column is as low as possible.

The column generally constitutes a granular medium and the fluid moving between the various plates is a liquid in downflow mode.

The present invention consists of an ensemble of networks for the distribution of fluids supplying the column, a distribution network being assigned to each of the plates of said column, and being constituted by substantially horizontal lines 6 having a plurality of degrees of branching from 1 to rank N, the ensemble of lines from rank P to rank N (P being in the range 1 to N, limits included) being adherent to the base plane of the plate under consideration, and the lines of the last degree of branching N communicating with mixing chambers 8 disposed immediately below said base plane.

More precisely, if H denotes the distance separating the lower end of a line of the network from the base plane of the immediately downstream distributor plate, the line under consideration is said to be adherent to the distributor plate if H is in the range 0 to one quarter of the diameter of the line under consideration.

In the general case in which the distribution network has a plurality of degrees of branching, these various degrees are denoted 1 to N starting from the principal line denoted 1 and moving towards the lines of the last degree of branching, denoted N.

Thus, the invention consists in that at least a portion of the lines from one branching level P to the last branching rank N are adherent to the distributor plate. Preferably, all of the lines constituting the network from rank 1 to rank N are adherent to the distributor plate.

In this case, the network is said to be entirely adherent.

In a preferred variation, the invention also consists in the use of fillers disposed below at least a portion of the lines constituting the network and separating said lines from the surrounding granular medium in order to minimize the axial dispersion resulting from the presence of said lines in the granular medium.

The invention also consists in a simulated moving bed separation process which uses the device of the present invention, in which the feed to be separated is any mixture of aromatic compounds containing 7 to 9 carbon atoms.

The invention also consists in a simulated moving bed separation process using the device of the present invention in which the feed to be separated is a mixture of normal and iso-paraffins.

Finally, the invention consists of a simulated moving bed separation process using a device of the present invention, in which the feed to be separated is a mixture of normal and iso-olefins.

More generally, any process which uses one or more multi-stage columns necessitating a fluid distribution system at each plate or only a portion of said plates constituting the column, and especially simulated moving bed processes, may receive the fluid distribution device of the present invention.

The principal fluid passing through said device preferably has a density in the range 600 to 950 kg/m$^3$, and a viscosity in the range 0.1 to 0.6 cPo. The abbreviation cPo designates centipoises, i.e. $10^{-3}$ kg/m·s.

In the majority of cases, and with the fluids involved in the applications of the process, the device of the present invention can produce an axial dispersion coefficient at any point of a bed in the column of less than $3 \times 10^{-3}$ cm$^2$/s.

DETAILED DESCRIPTION OF THE INVENTION

The present invention may be used in processes employing a fluid moving through a granular medium divided into a plurality of beds. The vessel containing the plurality of beds is generally cylindrical and thus constitutes a column, but the cylindrical form is not obligatory and other forms are possible. In the remainder of the text, the term "column" is used, regardless of the geometry of said column.

The invention is thus applicable to a column having several beds disposed in series, such a column being termed multi-staged. The beds of granular solid are separated by distributor plates which can carry out injections or withdrawals of the various fluids within the beds and necessitating transport of said fluids from the exterior of the column to the plate in the case of injection of a fluid and from the plate to the exterior of the column in the case of withdrawal of a fluid.

The lines for injection or withdrawal of the various fluids form a network at each distributor plate.

In general, a distributor plate is interposed between the bed of granular solid immediately upstream of said distributor plate and the bed of granular solid immediately downstream of said plate.

The present invention is applied when the network of lines used are at least partially immersed in the bed of granular solid immediately upstream, as defined above. In other words, the distributor plate supplying a bed of stage P is at least partially immersed in the granular medium of the bed of stage P−1.

FIG. 1, in accordance with the prior art, diagrammatically represents a portion of the column 1 sub-divided into a multitude of beds 2, each of the beds 2 being constituted by a fixed bed of solid particles. The column is flushed by a principal downflow symbolized by the downwardly directed black arrow.

The beds 2 are separated by distributor plates the function of which is to be able to withdraw or inject a flow of fluid which is miscible with the principal flow coming from the bed above.

A distributor plate is generally sub-divided into panels 5 collecting the fluid leaving the bed immediately above. The plate is divided into panels in order to facilitate the mixing function between the fluid leaving the upstream bed of the plate and the fluid injected into the plate. Each panel 5 comprises an upper screen 4 or perforated plate supporting the upper bed, and a fluid distributor 3 at the bottom of the panel to supply the bed of particles located downstream of said plate.

This distributor 3 may be constituted by a screen or a perforated plate. Each panel 5 is connected to a supply network with one or more injection points. The injection network 6 supplies an injection chamber 8 disposed in the panel itself and comprising openings such that injection or withdrawal of fluid is carried out in the panel itself.

In accordance with the prior art, the injection chamber 8 is generally placed inside the panel 5, as can be seen in FIG. 1. It may in some cases be partially immersed in the granular medium of the bed which is located upstream by placing said chamber on the upper screen 4.

The geometry of the panels is generally designed so as to produce a good mixing between the principal fluid coming from the bed above and the fluid injected by the network, before distribution to the bed below. The quality of mixing and the distribution of the fluids depends in part on the manner in which the panels are divided and their number.

Many variations in the manner in which the plates are divided into panels are possible.

A distributor plate is connected to the distribution/collection network composed of various lines which include at least one principal line 6, and a secondary line 7. Other lines corresponding to higher degrees of branching, for example three or four, are possible, but for simplification the present description will be limited to a network comprising a principal line 6 and a secondary line 7.

According to the prior art, the principal line 6 is generally positioned at a non-zero distance H with respect to the support screen 4, although the secondary lines 7 have at least one substantially vertical segment which is directed downwardly, to connect the horizontal line 6 to the panel 5 of the distributor plate.

FIG. 2 is one example of a "rake" type network of lines, viewed from above.

The panels 5 divide the plate into parallel sectors of approximately the same width.

The secondary lines 7 are all aligned substantially in one common direction corresponding to the length (or larger dimension) of the panels 5.

The principal line 6 is connected to the secondary lines 7 at different points distributed along the principal line 6 and defining each of the sectors. The ends of the secondary lines 7 supply the injection chambers 8 which cover the panels 5 over the major part of their length.

FIG. 3, in accordance with the prior art, is another example of a network of lines, termed an "octopus", viewed from above.

The panels 5 correspond here to angular sectors.

The principal line 6 thus guides the fluid from the exterior to the centre of the column, then distributes it between the various secondary lines 7 which radiate across the section of the column in accordance with the various angular sections, via a distribution chamber which may be circular, as shown in FIG. 3.

FIG. 4 is another example of a line network, using several successive sub-divisions of the network. The principal line 6 is divided into two lines which themselves supply other secondary columns, thus forming a network with three degrees. Compared with FIG. 2, the network has a third degree of branching corresponding to lines 9. Each line 9 supplies two contiguous panels 5.

These various configurations of the network are given by way of illustration, and the present invention may be applicable to any type of network. Preferably, the present invention is applicable to a network with multiple branches, such as that shown in FIG. 4.

FIG. 5A corresponds to a detailed view of the network in which a portion of the horizontal secondary line 7h can be seen; it is not adherent to the plate, followed after an elbow by another vertical portion 7v connected to the plate. The non-zero distance separating the horizontal portion 7h of the secondary line from the distributor plate 4 is denoted H.

FIG. 5B is a section along AA in FIG. 5A.

FIG. 5C is a section along AA in the case in which, in accordance with the invention, the lines of the secondary network are adherent to the associated plate. In accordance with the invention, the distance H is equal to one quarter of the diameter of the line 7h.

FIG. 5D is a section along AA in the case in which, in accordance with the invention, the secondary lines are adherent to the distributor plate 4 and, in accordance with a preferred variation, separated from the granular bed by fillers 10 which mean that fluid does not move beneath the secondary lines; they obstruct the volume located below the lines of the network.

FIG. 6 illustrates several embodiments of the invention. The constant aim is to minimize the volume included between the network and the associated plate.

In FIG. 6a, two fillers may be used which can obstruct the volume either side of the line 7h.

In FIG. 6b, a single U-shaped filler can be used on which the line 7h rests.

In FIG. 6c, a network composed of profiled lines with a flat bottom can be used.

FIG. 7 diagrammatically represents a portion of column 1 sub-divided into a multitude of granular beds 2 each containing a fixed bed of solid particles.

In FIG. 7, in its preferred variation the invention is applied in which the principal lines 6 and the secondary lines 7 are adherent to the plate, i.e. the distance H is zero.

More generally, when the network comprises several degrees of branching from 1 to N, the invention consists of ensuring that a portion of the branches are adherent to the plate supporting the bed under consideration, and preferably that all of the branches are adherent to the plate under consideration.

In certain cases when this condition is very difficult to achieve, the adherence condition may be limited to the last degrees of branching, for example from P to N, by providing that the degrees of branching from 1 to P−1 are disposed at a non-zero height H above the plate. A network is in accordance with the present invention as soon as at least the last degree of branching is adherent to the plate.

EXAMPLE

The importance of the invention was demonstrated with a series of hydrodynamic computations carried out in a twodimensional configuration shown in FIG. 8A which shows various elevations of a line with respect to the base plane of the distributor plate. The various greyed out zones correspond to the levels of re-circulation of the fluid passing through the granular bed. In particular, the black zone below the line corresponds to a dead zone, i.e. a zone with maximum re-circulation.

However, a flow which is as close as possible to plug flow is sought, i.e. without re-circulation.

The configuration being studied consisted of a granular bed with dimensions (1 m high)×(1 m wide), the third dimension, or length, being assumed to be much larger than the height and length.

The grains constituting the granular bed were spherical, non porous grains with a diameter of 0.6 mm and defined an interstitial porosity of 32%.

A line 3 meters long, with a diameter of 0.25 m was embedded in the bed of particles.

The distance (H) between the lowest point (or lower extremity) of the line and the bottom of the bed (or lower plate) was between 0 and 0.65 m.

The case in which the line was adherent to the lower plate, (H=0) with the presence of a filler 9 below the line corresponds to FIG. 5D.

A flow of water at ambient temperature was simulated in the downwards direction through the granular bed. The velocity profile of the liquid was flat at the inlet to the bed.

The flow was simulated in accordance with a porous medium flow model denoted the "Brinkman-Forchheimer" model the details of which may, for example, be found in the article by F Benyahia, "*On the modeling of flow in packed bed systems*", Part Sci Tech 22 (2004), 367-378.

The axial dispersion resulting from the various test configurations was measured by the axial dispersion coefficient Dax, in cm$^2$/s.

Figure 8B:
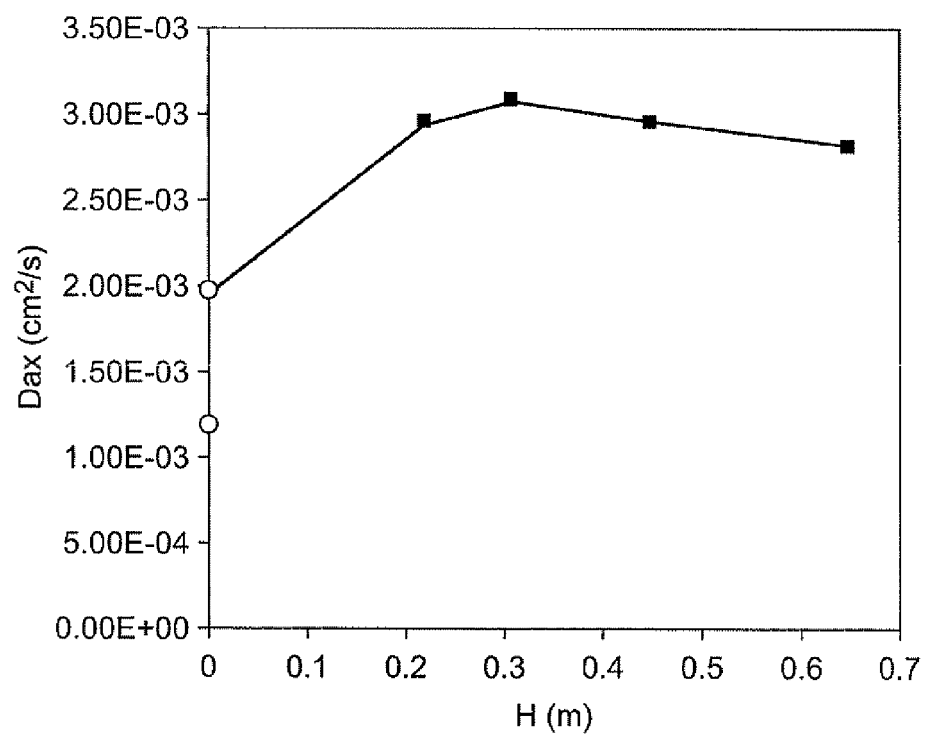
FIG. 8B is a graph illustrating the reduction in axial dispersion induced by the invention, in the basic form (line adherent to the plate) or preferred form (adherent line with supplemental filler) in the 2D case of a line 0.35 m in diameter in a fixed bed 1 m wide and 1 m high.

The change in Dax as a function of the distance or height (H) separating the line from the lower plate is shown in FIG. 8B.

It is very clear from FIG. 8B that the axial dispersion coefficient Dax reduces as the line approaches the plate, passing from a value of approximately $3\times10^{-3}$ to $2\times10^{-3}$ cm$^2$/s.

The height H was measured with respect to the lower extremity of the line.

The two points noted in white on FIG. 8B correspond to the invention. The other points denoted in black on FIG. 8B correspond to the prior art.

By flattening the line at the lower plate, the axial dispersion coefficient Dax reached a minimized value of $2\times10^{-3}$ cm$^2$/s.

Further, by placing lateral fillers separating the line from the granular medium and aimed at further reducing the dead volumes below the line, the axial dispersion was reduced further and dropped from $2\times10^{-3}$ to $1.2\times10^{-3}$ cm$^2$/s.

The invention claimed is:

1. A device comprising: a multi-stage column having a succession of distributor plates, each plate supporting a bed of granular solid, each plate having a base plane defined by the top of the plate supporting the bed of granular solid and having mixing chambers (8) disposed immediately below said base plane and each plate being provided with a network for distributing fluids, said network comprising substantially horizontal lines above the base plane of the plate, said lines having a diameter for carrying said fluids (6, 7, 10), and said lines having a plurality of degrees of branching lines in fluid communication with the mixing chambers in the distributor plates, the number of branching lines being from 1 to rank N, the lines from rank P to rank N, P being a selected rank from 1 to N, being adherent to the base plane of the plate under consideration, adherent meaning that, with H denoting a distance separating a lower end of the horizontal line of the network from the base plane of the distributor plate with which the branching line is in fluid communication, H is in the range 0 to a quarter of the diameter of the line under consideration.

2. A device according to claim 1, in which all of the lines (6, 7, 10) constituting the distribution network from rank 1 to rank N are adherent to the base plane of the plate with which they are in fluid communication.

3. A device according to claim 2, in which the plate is divided into M approximately equal size angular-shaped sectors, each sector being served by at least one terminal of rank N of the distribution network.

4. A device according to claim 3, in which at least a portion of the lines (6, 7, 10) of the network from rank P to rank N is provided with fillers (9).

5. A device according to claim 2, in which at least a portion of the lines (6, 7, 10) of the network from rank P to rank N is provided with fillers (9).

6. A device according to claim 1, in which the plate is divided into M approximately equal size angular-shaped sectors, each sector being served by at least one terminal of rank N of the distribution network.

7. A device for distributing fluids according to claim 6, in which at least a portion of the lines (6, 7, 10) of the network from rank P to rank N is provided with fillers (9).

8. A device according claim 1, in which at least a portion of the lines (6, 7, 10) of the network from rank P to rank N is provided with fillers (9).

9. A device according to claim 1, in which all of the lines (6, 7, 10) constituting the network from rank 1 to rank N are provided with fillers (9).

10. In a simulated moving bed separation process in which the feed to be separated is any mixture of aromatic compounds containing 7 to 9 carbon atoms, the improvement wherein the process is conducted in a device according to claim 1.

11. In a simulated moving bed separation process in which the feed to be separated is a mixture of normal and iso-paraffins, the improvement wherein the process is conducted in a device according to claim 1.

12. In a simulated moving bed separation process in which the feed to be separated is a mixture of normal and iso-olefins, the improvement wherein the process is conducted in a device according to claim 1.

13. A process for simulated moving bed separation, wherein the process is conducted in a device in accordance with claim 1, in which a principal fluid passing through said device has a density in the range 600 to 950 kg/m$^3$ and a viscosity in the range 0.1 to 0.6 cPo.

14. A process for simulated moving bed separation, wherein the process is conducted in a device according to claim 1 having an axial dispersion coefficient at any point of a bed of the column of less than $3\times10^{-3}$ cm$^2$/s.

15. A device according to claim 1, wherein at least one branching line is adherent to the base plane with H being 0.

16. A device according to claim 1, wherein all the branching lines are adherent to the base plane with H being 0.

* * * * *

UNITED STATES PATENT AND TRADEMARK OFFICE
CERTIFICATE OF CORRECTION

PATENT NO. : 8,641,906 B2  
APPLICATION NO. : 12/989125  
DATED : February 4, 2014  
INVENTOR(S) : Frederic Augier Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 412 days.

Signed and Sealed this

Twenty-second Day of September, 2015

Michelle K. Lee
*Director of the United States Patent and Trademark Office*